(12) United States Patent
Ilchenko et al.

(10) Patent No.: US 8,498,539 B1
(45) Date of Patent: Jul. 30, 2013

(54) DIELECTRIC PHOTONIC RECEIVERS AND CONCENTRATORS FOR RADIO FREQUENCY AND MICROWAVE APPLICATIONS

(75) Inventors: Vladimir Ilchenko, Arcadia, CA (US); Anatoliy Savchenkov, Glendale, CA (US); Andrey B. Matsko, Pasadena, CA (US); David Seidel, Alta Loma, CA (US); Lute Maleki, Pasadena, CA (US)

(73) Assignee: OEwaves, Inc., Pasadena, CA (US)

( * ) Notice: Subject to any disclaimer, the term of this patent is extended or adjusted under 35 U.S.C. 154(b) by 464 days.

(21) Appl. No.: 12/764,943

(22) Filed: Apr. 21, 2010

Related U.S. Application Data

(60) Provisional application No. 61/171,188, filed on Apr. 21, 2009, provisional application No. 61/248,939, filed on Oct. 6, 2009.

(51) Int. Cl.
*H04B 10/00* (2013.01)

(52) U.S. Cl.
USPC .......................................... 398/115; 398/116

(58) Field of Classification Search
USPC .................................. 398/115–131
See application file for complete search history.

(56) References Cited

U.S. PATENT DOCUMENTS

| | | | |
|---|---|---|---|
| 5,015,052 A * | 5/1991 | Ridgway et al. ............... 385/2 |
| 5,204,640 A | 4/1993 | Logan, Jr. | |
| 5,220,292 A | 6/1993 | Bianchini et al. | |
| 5,652,556 A * | 7/1997 | Flory et al. ............... 333/219.1 |
| 5,723,856 A | 3/1998 | Yao et al. | |
| 5,751,747 A | 5/1998 | Lutes et al. | |
| 5,777,778 A | 7/1998 | Yao | |
| 5,917,179 A | 6/1999 | Yao | |
| 5,929,430 A | 7/1999 | Yao et al. | |
| 5,936,589 A * | 8/1999 | Kawahata ................... 343/785 |
| 5,985,166 A | 11/1999 | Unger et al. | |
| 6,080,586 A | 6/2000 | Baldeschwieler et al. | |
| 6,178,036 B1 | 1/2001 | Yao | |
| 6,203,660 B1 | 3/2001 | Unger et al. | |
| 6,317,094 B1 * | 11/2001 | Wu et al. ....................... 343/767 |
| 6,389,197 B1 | 5/2002 | Iltchenko et al. | |
| 6,417,957 B1 * | 7/2002 | Yao .............................. 359/334 |
| 6,473,218 B1 | 10/2002 | Maleki et al. | |
| 6,476,959 B2 | 11/2002 | Yao | |
| 6,487,233 B2 | 11/2002 | Maleki et al. | |
| 6,488,861 B2 | 12/2002 | Iltchenko et al. | |
| 6,490,039 B2 | 12/2002 | Maleki et al. | |
| 6,501,433 B2 * | 12/2002 | Popa et al. ................... 343/785 |

(Continued)

FOREIGN PATENT DOCUMENTS

WO WO-2001/096936 A1 12/2001
WO WO-2005/038513 A2 4/2005

(Continued)

OTHER PUBLICATIONS

Ayazi et al. "All-Dielectric Photonic-Assisted Wireless Receiver" 2007, IEEE, pp. 42-43.*

(Continued)

*Primary Examiner* — Agustin Bello
(74) *Attorney, Agent, or Firm* — Perkins Coie LLP

(57) ABSTRACT

Techniques, devices and systems for using dielectric materials, without metal or electrically conductive materials, to construct photonic RF and microwave receivers and concentrators.

48 Claims, 7 Drawing Sheets

U.S. PATENT DOCUMENTS

| | | | |
|---|---|---|---|
| 6,535,328 B2 | 3/2003 | Yao | |
| 6,567,436 B1 | 5/2003 | Yao et al. | |
| 6,580,532 B1 | 6/2003 | Yao et al. | |
| 6,594,061 B2 | 7/2003 | Huang et al. | |
| 6,633,696 B1* | 10/2003 | Vahala et al. | 385/27 |
| 6,762,869 B2 | 7/2004 | Maleki et al. | |
| 6,781,696 B1* | 8/2004 | Rosenberger et al. | 356/437 |
| 6,785,435 B2* | 8/2004 | Ridgway et al. | 385/14 |
| 6,795,481 B2* | 9/2004 | Maleki et al. | 372/108 |
| 6,798,947 B2 | 9/2004 | Iltchenko | |
| 6,853,479 B1 | 2/2005 | Ilchenko et al. | |
| 6,859,582 B2* | 2/2005 | Cai et al. | 385/30 |
| 6,871,025 B2* | 3/2005 | Levi et al. | 398/183 |
| 6,873,631 B2 | 3/2005 | Yao et al. | |
| 6,879,752 B1 | 4/2005 | Ilchenko et al. | |
| 6,901,189 B1 | 5/2005 | Savchenkov et al. | |
| 6,906,309 B2 | 6/2005 | Sayyah et al. | |
| 6,922,497 B1 | 7/2005 | Savchenkov et al. | |
| 6,928,091 B1 | 8/2005 | Maleki et al. | |
| 6,943,934 B1 | 9/2005 | Ilchenko et al. | |
| 6,987,914 B2 | 1/2006 | Savchenkov et al. | |
| 7,024,069 B2 | 4/2006 | Savchenkov et al. | |
| 7,043,117 B2 | 5/2006 | Matsko et al. | |
| 7,050,212 B2* | 5/2006 | Matsko et al. | 359/245 |
| 7,061,335 B2 | 6/2006 | Maleki et al. | |
| 7,062,131 B2 | 6/2006 | Ilchenko | |
| 7,092,591 B2 | 8/2006 | Savchenkov et al. | |
| 7,133,180 B2 | 11/2006 | Ilchenko et al. | |
| 7,173,749 B2* | 2/2007 | Maleki et al. | 359/239 |
| 7,184,451 B2 | 2/2007 | Ilchenko et al. | |
| 7,187,870 B2 | 3/2007 | Ilchenko et al. | |
| 7,218,662 B1 | 5/2007 | Ilchenko et al. | |
| 7,248,763 B1 | 7/2007 | Kossakovski et al. | |
| 7,260,279 B2 | 8/2007 | Gunn et al. | |
| 7,283,707 B1 | 10/2007 | Maleki et al. | |
| 7,292,112 B2* | 11/2007 | Oxborrow | 331/96 |
| 7,356,214 B2 | 4/2008 | Ilchenko | |
| 7,362,927 B1 | 4/2008 | Ilchenko et al. | |
| 7,369,722 B2 | 5/2008 | Yilmaz et al. | |
| 7,389,053 B1 | 6/2008 | Ilchenko et al. | |
| 7,400,796 B1 | 7/2008 | Kossakovski et al. | |
| 7,440,651 B1 | 10/2008 | Savchenkov et al. | |
| 7,460,746 B2 | 12/2008 | Maleki et al. | |
| 7,480,425 B2 | 1/2009 | Gunn et al. | |
| 7,570,850 B1* | 8/2009 | Matsko et al. | 385/30 |
| 7,587,144 B2 | 9/2009 | Ilchenko et al. | |
| 7,630,417 B1* | 12/2009 | Maleki et al. | 372/20 |
| 7,634,201 B2 | 12/2009 | Maleki et al. | |
| 7,715,081 B1* | 5/2010 | Krawczak | 359/245 |
| 7,777,583 B2* | 8/2010 | Taber et al. | 331/96 |
| 7,801,189 B2 | 9/2010 | Maleki et al. | |
| 7,813,651 B2 | 10/2010 | Ilchenko et al. | |
| 7,835,600 B1* | 11/2010 | Yap et al. | 385/12 |
| 7,869,472 B2 | 1/2011 | Maleki et al. | |
| 7,929,589 B1 | 4/2011 | Ilchenko et al. | |
| 7,965,745 B2 | 6/2011 | Maleki et al. | |
| 7,970,245 B2* | 6/2011 | Park et al. | 385/37 |
| 7,982,944 B2* | 7/2011 | Kippenberg et al. | 359/330 |
| 7,991,025 B2 | 8/2011 | Maleki et al. | |
| 8,055,136 B2* | 11/2011 | Pescod et al. | 398/115 |
| 8,089,684 B1 | 1/2012 | Koonath et al. | |
| 8,094,359 B1* | 1/2012 | Matsko et al. | 359/239 |
| 8,102,597 B1 | 1/2012 | Maleki et al. | |
| 8,111,722 B1 | 2/2012 | Maleki et al. | |
| 8,155,913 B2 | 4/2012 | Eliyahu et al. | |
| 8,155,914 B2 | 4/2012 | Eliyahu et al. | |
| 8,159,736 B2 | 4/2012 | Maleki et al. | |
| 8,180,183 B1* | 5/2012 | Yap | 385/2 |
| 8,218,232 B2* | 7/2012 | Mitsugi et al. | 359/346 |
| 8,289,616 B1 | 10/2012 | Maleki et al. | |
| 8,311,376 B1 | 11/2012 | Maleki et al. | |
| 2001/0038651 A1 | 11/2001 | Maleki et al. | |
| 2002/0018611 A1 | 2/2002 | Maleki et al. | |
| 2002/0018617 A1 | 2/2002 | Iltchenko et al. | |
| 2002/0021765 A1* | 2/2002 | Maleki et al. | 375/300 |
| 2002/0081055 A1* | 6/2002 | Painter et al. | 385/2 |
| 2002/0085266 A1 | 7/2002 | Yao | |
| 2002/0097401 A1 | 7/2002 | Maleki et al. | |
| 2003/0160148 A1* | 8/2003 | Yao et al. | 250/205 |
| 2004/0100675 A1* | 5/2004 | Matsko et al. | 359/245 |
| 2004/0109217 A1 | 6/2004 | Maleki et al. | |
| 2004/0218880 A1 | 11/2004 | Matsko et al. | |
| 2004/0240781 A1* | 12/2004 | Savchenkov et al. | 385/27 |
| 2005/0017816 A1 | 1/2005 | Ilchenko et al. | |
| 2005/0063034 A1* | 3/2005 | Maleki et al. | 359/245 |
| 2005/0074200 A1 | 4/2005 | Savchenkov et al. | |
| 2005/0123306 A1 | 6/2005 | Ilchenko et al. | |
| 2005/0128566 A1* | 6/2005 | Savchenkov et al. | 359/321 |
| 2005/0147355 A1* | 7/2005 | Ilchenko | 385/50 |
| 2005/0151604 A1* | 7/2005 | Brunker | 333/219.1 |
| 2005/0175358 A1 | 8/2005 | Ilchenko et al. | |
| 2005/0196103 A1* | 9/2005 | Kaplan | 385/50 |
| 2005/0220411 A1* | 10/2005 | Ilchenko | 385/39 |
| 2005/0248823 A1 | 11/2005 | Maleki et al. | |
| 2005/0253672 A1* | 11/2005 | Enokihara et al. | 333/219.1 |
| 2005/0286602 A1* | 12/2005 | Gunn et al. | 372/94 |
| 2006/0285799 A1* | 12/2006 | Spillane et al. | 385/50 |
| 2007/0009205 A1 | 1/2007 | Maleki et al. | |
| 2007/0153289 A1 | 7/2007 | Yilmaz et al. | |
| 2008/0001062 A1* | 1/2008 | Gunn et al. | 250/206 |
| 2008/0023632 A1* | 1/2008 | Ridgway et al. | 250/338.1 |
| 2008/0024119 A1* | 1/2008 | Gualtieri | 324/207.15 |
| 2008/0063411 A1* | 3/2008 | Lekkas et al. | 398/187 |
| 2008/0075464 A1 | 3/2008 | Maleki et al. | |
| 2008/0212968 A1* | 9/2008 | Lindop et al. | 398/91 |
| 2008/0285617 A1* | 11/2008 | Moldover et al. | 374/117 |
| 2008/0310463 A1 | 12/2008 | Maleki et al. | |
| 2009/0016729 A1* | 1/2009 | Ridgway et al. | 398/115 |
| 2009/0047023 A1* | 2/2009 | Pescod et al. | 398/115 |
| 2009/0097516 A1 | 4/2009 | Maleki et al. | |
| 2009/0135860 A1 | 5/2009 | Maleki et al. | |
| 2009/0208205 A1 | 8/2009 | Eliyahu et al. | |
| 2009/0251705 A1* | 10/2009 | Le et al. | 356/480 |
| 2009/0289729 A1* | 11/2009 | Taber et al. | 331/96 |
| 2009/0310629 A1 | 12/2009 | Maleki et al. | |
| 2009/0324251 A1 | 12/2009 | Ilchenko et al. | |
| 2010/0232810 A1* | 9/2010 | Hillis et al. | 398/202 |
| 2011/0064415 A1* | 3/2011 | Williams et al. | 398/115 |
| 2011/0110387 A1 | 5/2011 | Maleki et al. | |
| 2011/0150485 A1 | 6/2011 | Seidel et al. | |
| 2011/0253897 A1* | 10/2011 | Saeedkia et al. | 250/358.1 |
| 2011/0255094 A1 | 10/2011 | Mohageg et al. | |
| 2012/0039346 A1 | 2/2012 | Liang et al. | |
| 2012/0194893 A1 | 8/2012 | Maleki et al. | |
| 2012/0195590 A1 | 8/2012 | Eliyahu et al. | |

FOREIGN PATENT DOCUMENTS

| | | |
|---|---|---|
| WO | WO-2005/055412 A2 | 6/2005 |
| WO | WO-2005/067690 A2 | 7/2005 |
| WO | WO-2005/122346 A2 | 12/2005 |
| WO | WO-2006/076585 A2 | 7/2006 |
| WO | WO-2007/143627 A2 | 12/2007 |

OTHER PUBLICATIONS

Hsu et al. "All-Dielectric Wireless Receiver" 2007, IEEE, pp. 221-224.*

Braginsky, V.B., et al., "Quality-Factor and Nonlinear Properties of Optical Whispering-Gallery Modes," *Physics Letters A*, 137(7, 8):393-397, May 1989.

Eliyahu, D., et al., "Low Phase Noise and Spurious Levels in Multi-Loop Opto-Electronic Oscillators," *Proceedings of the 2003 IEEE International Frequency Control Symposium and PDA Exhibition*, pp. 405-410, May 2003.

Eliyahu, D., et al., "Modulation Response (S21) of the Coupled Opto-Electronic Oscillator," *Proceedings of the 2005 IEEE International Frequency Control Symposium and Exposition*, pp. 850-856, Aug. 2005.

Eliyahu, D., et al., "Tunable, Ultra-Low Phase Noise YIG Based Opto-Electronic Oscillator," *IEEE MTT-S International Microwave Symposium Digest*, 3:2185-2187, Jun. 2003.

Gorodetsky, M.L., et al., "Optical Microsphere Resonators: Optimal Coupling to High-Q Whispering-Gallery Modes," *J.Opt. Soc. Am. B*, 16(1):147-154, Jan. 1999.

Gorodetsky, M.L., et al., "Rayleigh Scattering in High-Q Microspheres," *J. Opt. Soc. Am. B*, 17(6):1051-1057, Jun. 2000.

Gorodetsky, M.L., et al., "Ultimate Q of Optical Microsphere Resonators," *Optics Letters*, 21(7):453-455, Apr. 1996.

Hryniewicz, J.V., et al., "Higher Order Filter Response in Coupled Microring Resonators," *IEEE Photonics Technology Letters*, 12(3):320-322, Mar. 2000.

Huang, S., et al., "A 'Turnkey' Optoelectronic Oscillator with Low Acceleration Sensitivity," *2000 IEEE/EIA International Frequency Control Symposium and Exhibition*, pp. 269-279, Jun. 2000.

Ilchenko, V., et al., "Electrooptically Tunable Photonic Microresonators and Photonic Bandgap Waveguide Coupling for Micro-Optoelectronic Oscillators," *GOMACTech 2003*, Tampa, Florida, pp. 1-4.

Ilchenko, V., et al., "High-Q Microsphere Cavity for Laser Stabilization and Optoelectronic Microwave Oscillator," *Proceedings SPIE Microresonators and Whispering-Gallery Modes*, vol. 3611, pp. 190-198, Jan. 1999.

Ilchenko, V., et al., "Microsphere Integration in Active and Passive Photonics Devices," *Proc. of SPIE Laser Resonators III*, vol. 3930, pp. 154-162, Jan. 2000.

Ilchenko, V., et al., "Microtorus: A High-Finesse Microcavity with Whispering-Gallery Modes," *Optics Letters*, 26(5):256-258, Mar. 2001.

Ilchenko, V., et al., "Pigtailing the High-$Q$ Microsphere Cavity: A Simple Fiber Coupler for Optical Whispering-Gallery Modes," *Optics Letters*, 24(11):723-725, Jun. 1999.

Ilchenko, V., et al., "Sub-Micro Watt Photonic Microwave Receiver," *IEEE Photonics Technology Letters*, 14(11):1602-1604, Nov. 2002.

Ilchenko, V., et al., "Tunability and Synthetic Lineshapes in High-Q Optical Whispering Gallery Modes," *Proc. of SPIE Laser Resonators and Beam Control VI*, vol. 4969, pp. 195-206, Jan. 2003.

Ilchenko, V., et al., "Whispering-Gallery-Mode Electro-Optic Modulator and Photonic Microwave Receiver," *J. Opt. Soc. Am. B*, 20(2):333-342, Feb. 2003.

Ito, H., et al., "InP/InGaAs Uni-Travelling-Carrier Photodiode with 310 GHz Bandwidth," *Electronics Letters*, 36(21):1809-1810, Oct. 2000.

Logan, R., et al., "Stabilization of Oscillator Phase Using a Fiber-Optic Delay-Line," *IEEE 45th Annual Symposium on Frequency Control*, pp. 508-512, May 1991.

Maleki, L., "The Opto-Electronic Oscillator: Prospects for Extending the State of the Art in Reference Frequency Generation," *International Topical Meeting on Microwave Photonics*, pp. 195-198, Oct. 1998.

Matsko, A., et al., "Active Mode Locking with Whispering-Gallery Modes," *J. Opt. Soc. Am. B*, 20(11):2292-2296, Nov. 2003.

Matsko, A., et al., "Whispering-Gallery-Mode based Optoelectronic Microwave Oscillator," *Journal of Modern Optics*, 50(15-17):2523-2542, Feb. 2004.

Matsko, A., et al., "Whispering-Gallery-Mode Resonators as Frequency References. I. Fundamental Limitations," *J. Opt. Soc. Am. B*, 24(6):1324-1335, Jun. 2007.

Myers, L.E., et al., "Quasi-Phase-Matched Optical Parametric Oscillators in Bulk Periodically Poled LiNbO3," *J. Opt. Soc. Am. B*, 12(11):2102-2116, Nov. 1995.

Savchenkov, A., et al., "RF photonic signal processing components: From high order tunable filters to high stability tunable oscillators," *IEEE Radar Conference*, pp. 1-6, May 2009.

Savchenkov, A., et al., "Tunable Resonant Single-Sideband Electro-Optical Modulator," *Digest of the IEEE/LEOS Summer Topical Meetings*, pp. 63-64, Jul. 2009.

Savchenkov, A., et al., "Whispering-Gallery-Mode Resonators as Frequency References. II. Stabilization," *J. Opt. Soc. Am. B*, 24(12):2988-2997, Dec. 2007.

Vassiliev, V.V., et al., "Narrow-Line-Width Diode Laser with a High-$Q$ Microsphere Resonator," *Optics Communications*, 158(1-6):305-312, Dec. 1998.

Yao, X.S., et al., "A Novel Photonic Oscillator," *Digest of the LEOS Summer Topical Meetings*, pp. 17-18, Aug. 1995.

Yao, X.S., et al., "A Novel Photonic Oscillator," *TDA Progress Report 42-122*, pp. 32-43, Aug. 1995.

Yao, X.S., et al., "Converting Light into Spectrally Pure Microwave Oscillation," *Optics Letters*, 21(7):483-485, Apr. 1996.

Yao, X.S., et al., "Coupled Optoelectronic Oscillators for Generating Both RF Signal and Optical Pulses," *Journal of Lightwave Technology*, 18(1):73-78, Jan. 2000.

Yao, X.S., et al., "Dual Microwave and Optical Oscillator," *Optics Letters*, 22(24):1867-1869, Dec. 1997.

Yao, X.S., et al., "Multiloop Optoelectronic Oscillator," *IEEE Journal of Quantum Electronics*, 36(1):79-84, Jan. 2000.

Yao, X.S., et al., "Optoelectronic Microwave Oscillator," *J. Opt. Soc. Am. B*, 13(8):1725-1735, Aug. 1996.

Yao, X.S., et al., "Optoelectronic Oscillator for Photonic Systems," *IEEE Journal of Quantum Electronics*, 32(7):1141-1149, Jul. 1996.

Yu, J., et al., "Compact Optoelectronic Oscillator with Ultra-Low Phase Noise Performance," *Electronics Letters*, 35(18):1554-1555, Sep. 1999.

\* cited by examiner

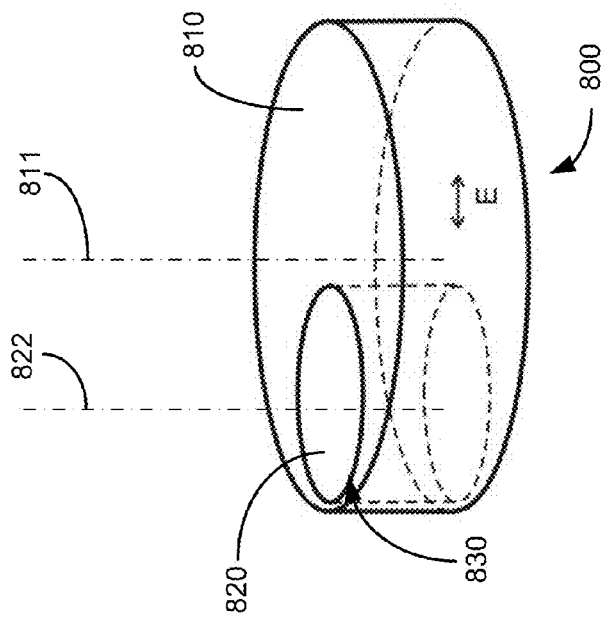
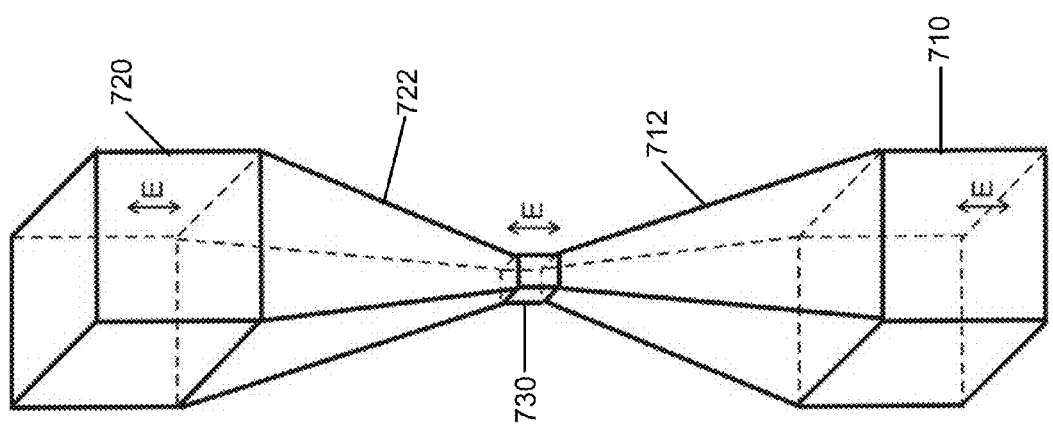

DIELECTRIC PHOTONIC RECEIVERS AND CONCENTRATORS FOR RADIO FREQUENCY AND MICROWAVE APPLICATIONS

PRIORITY CLAIMS AND RELATED PATENT APPLICATIONS

This patent document claims priorities of U.S. Provisional Application No. 61/171,188 entitled "DIELECTRIC TAPER-BASED METAL FREE FRONT-END PHOTONIC RF RECEIVERS" and filed on Apr. 21, 2009 and U.S. Provisional Application No. 61/248,939 entitled "RF FIELD CONCENTRATOR FOR METAL FREE FRONT END PHOTONIC RF RECEIVERS" and filed on Oct. 6, 2009, the entire disclosures of which are incorporated by reference as part of this document.

BACKGROUND

This specification relates to radio frequency (RF) and microwave receivers and devices.

RF and microwave circuits and devices commonly use metal components or electrically conductive components. The presence of metal or electrically conductive components renders these circuits and devices highly susceptible to interferences and damage from electromagnetic energy. Compact RF and microwave circuits operating at low voltages are especially vulnerable to such interferences and damage. Notably, RF and microwave communication devices and systems are equipped with antennas as part of their wireless receiver and transmitter modules which provide a direct pathway for electromagnetic radiation to RF and microwave circuits and devices within such systems and can cause undesired interferences or damage to the RF and microwave circuits and devices.

SUMMARY

This document describes, among others, devices, systems and techniques for using dielectric materials, without metal or electrically conductive materials, to construct photonic RF and microwave receivers and concentrators. Implementations of the described devices, systems and techniques can be used to reduce adverse impact of electromagnetic interferences or damages.

In one aspect, a method for receiving a radio frequency (RF) signal is provided to include using an all-dielectric RF antenna free of a metal to wirelessly receive an RF signal; coupling the RF signal received by the all-dielectric RF antenna into an all-dielectric RF waveguide free of a metal to guide the received RF signal away from the all-dielectric RF antenna; coupling the received RF signal in the all-dielectric RF waveguide into an all-dielectric RF resonator free of a metal that stores RF energy of the received RF signal that is coupled into the all-dielectric RF resonator; exposing an electro-optic material, which is free of a metal and exhibits an electro-optic effect, to the RF energy stored by the all-dielectric RF resonator; coupling continuous wave (CW) light into the electro-optic material to mix the CW light with the RF energy stored by the all-dielectric RF resonator to cause optical modulation of the CW light to produce modulated light that carries the RF signal; and processing the modulated light to extract the RF signal. In implementations, the all-dielectric RF antenna can be structured to efficiently receive the RF signal from the air; and, independently, the all-dielectric RF resonator can be structured to concentrate the RF energy in a small volume for efficient coupling with the electro-optic material.

In another aspect, a device for receiving a radio frequency (RF) signal is provided to include an all-dielectric RF waveguide free of a metal including a first waveguide end that receives an RF signal and a second waveguide end to which the received RF signal is guided; an all-dielectric RF resonator free of a metal that is electromagnetically coupled to the second waveguide end of the all-dielectric RF waveguide to receive and store RF energy of the RF signal; an optical resonator, which is formed of a dielectric material exhibiting an electro-optic effect and free of a metal, positioned relative to the all-dielectric RF resonator to be exposed to RF energy stored by the all-dielectric RF resonator; an optical coupling device coupling continuous wave (CW) light into the optical resonator to mix the CW light with the RF energy to cause optical modulation of the CW light based on the electro-optic effect to produce modulated light that carries the RF signal; an all-dielectric optical waveguide coupled to receive the modulated light from the optical resonator and to guide the modulated light away from the optical resonator; and an RF protected photodiode that receives the modulated light from the all-dielectric optical waveguide and converts the modulated light into an electrical signal representing the RF signal.

In another aspect, a device for receiving radio frequency (RF) signals is provided to include a tapered dielectric RF antenna structured to have an input end with a large cross section that receives an input RF signal and an output end with a small cross section smaller that the large cross section, and a tapered waveguide horn section connected between the input end and the output end and structured to have a cross section that reduces from the input end to the output end to guide the input RF signal to the output end, the output end being structured to have a concave opening to form a cavity or notch for outputting the input RF signal; and an optical whispering gallery mode (WGM) resonator formed of an electro-optic material and located outside the second end of the tapered dielectric RF antenna to directly receive the RF input signal from the second end to cause an electro-optic modulation of light in one or more WGM modes inside the optical WGM resonator based on interaction between the received input RF signal and the light in the electro-optic material so that the modulated light carries the input RF signal.

In another aspect, a device for receiving radio frequency (RF) signals is provided to include a dielectric RF antenna structured to receive an input RF signal and to output the received input RF signal; and an optical whispering gallery mode (WGM) resonator formed of an electro-optic material and located outside the dielectric RF antenna to directly receive the RF input signal to cause an electro-optic modulation of light in one or more WGM modes inside the optical WGM resonator based on interaction between the received input RF signal and the light in the electro-optic material so that the modulated light carries the input RF signal.

In another aspect, a device for receiving radio frequency (RF) signals is provided to include a dielectric RF antenna structured to receive an input RF signal; a dielectric RF waveguide that is electromagnetically coupled to the dielectric RF antenna to receive the input RF signal; a dielectric RF resonator that is electromagnetically coupled to the dielectric RF waveguide section to receive the input RF signal and is structured to be in resonance with the received the RF input signal; and an optical whispering gallery mode (WGM) resonator formed of an electro-optic material and located outside the dielectric RF resonator to be in electromagnetic coupling to the dielectric RF resonator to receive the RF input signal that interacts with the electro-optic material to cause an electro-optic modulation of light in one or more WGM modes inside the optical WGM resonator so that the modulated light carries the input RF signal.

In another aspect, a device for receiving radio frequency (RF) signals is provided to include a tapered dielectric RF antenna structured to receive an input RF signal and to include a tapered waveguide that has a larger first end that receives the received input RF signal and a smaller second end, and a tapered waveguide section connected between the larger first end and the smaller second end and structured to have a cross section that reduces from the larger first end to the smaller second end and focuses the received input RF signal towards the smaller second end; a narrow dielectric RF waveguide including a first tapered tip that is electromagnetically coupled to the smaller second end of the tapered dielectric RF antenna to receive the input RF signal and a narrow dielectric RF waveguide section connected to the first tapered tip to guide the RF input signal away from the first tapered tip; a dielectric RF resonator that is electromagnetically coupled to the narrow dielectric RF waveguide section to receive the input RF signal and is structured to be in resonance with the received the RF input signal; and an optical whispering gallery mode (WGM) resonator formed of an electro-optic material and located outside the dielectric RF resonator to be in electromagnetic coupling to the dielectric RF resonator to receive the RF input signal that interacts with the electro-optic material to cause an electro-optic modulation of light in one or more WGM modes inside the optical WGM resonator so that the modulated light carries the input RF signal.

In another aspect, a device for receiving radio frequency (RF) signals is provided to include a dielectric RF resonator that stores an RF signal. The RF resonator includes a first tapered waveguide side that has a larger first end and a smaller second end, and a tapered waveguide section connected between the larger first end and the smaller second end and structured to have a cross section that reduces from the larger first end to the smaller second end, and a second tapered waveguide side that has a larger second end and a second tapered waveguide section connected to the larger second end and structured to (1) have a cross section that reduces from the larger second end and (2) connect to the smaller second end to form a waist section. The device also includes an optical resonator located to interact with the RF signal at the waist section of the dielectric RF resonator.

In yet another aspect, a device for receiving radio frequency (RF) signals is provided to include a dielectric RF resonator which stores an RF signal and includes a dielectric cylindrical disk shaped to include a hollow cylindrical void inside dielectric cylindrical disk and off center from a symmetric axis of the dielectric cylindrical disk to form a narrow dielectric material section near an external side surface of the dielectric cylindrical disk; and an optical resonator located to interact with the RF signal at the narrow dielectric material section near the external side surface of the dielectric cylindrical disk.

Particular embodiments of the described aspects can be implemented to realize one or more of advantages. For example, front ends of RF and microwave receivers can be metal-free to reduce electromagnetic interferences and damage in environments where high power RF or microwave signals are present.

The details of these and other aspects are set forth in the accompanying drawings, the description and the claims below.

BRIEF DESCRIPTION OF THE DRAWINGS

FIGS. 7 and 8 show two examples of metal-free, all dielectric RF resonators shaped to concentrate the RF field within a small volume.

Like reference numbers and designations in the various drawings indicate like elements.

DETAILED DESCRIPTION

RF or microwave circuits and devices having metal or electrically conductive components are subject to electromagnetic interferences or damage. When unshielded and exposed to strong electromagnetic fields, e.g., in close proximity of RF transmitters, such as radars, TV or radio towers, such RF or microwave circuits and devices may experience significant operational disruption, stop functioning, or become damaged. These RF or microwave circuits and devices can also be destroyed by high power electromagnetic weapons including narrow band sources, known as high power microwave devices, and broadband (pulse) sources, known as electromagnetic pulse devices. Photonic technology allows reducing the impact of unwanted powerful RF radiation on the RF receiver by providing metal-free, all dielectric RF or microwave receiver front ends without having unshielded electronic circuitry and metal interconnects.

Figure 1:
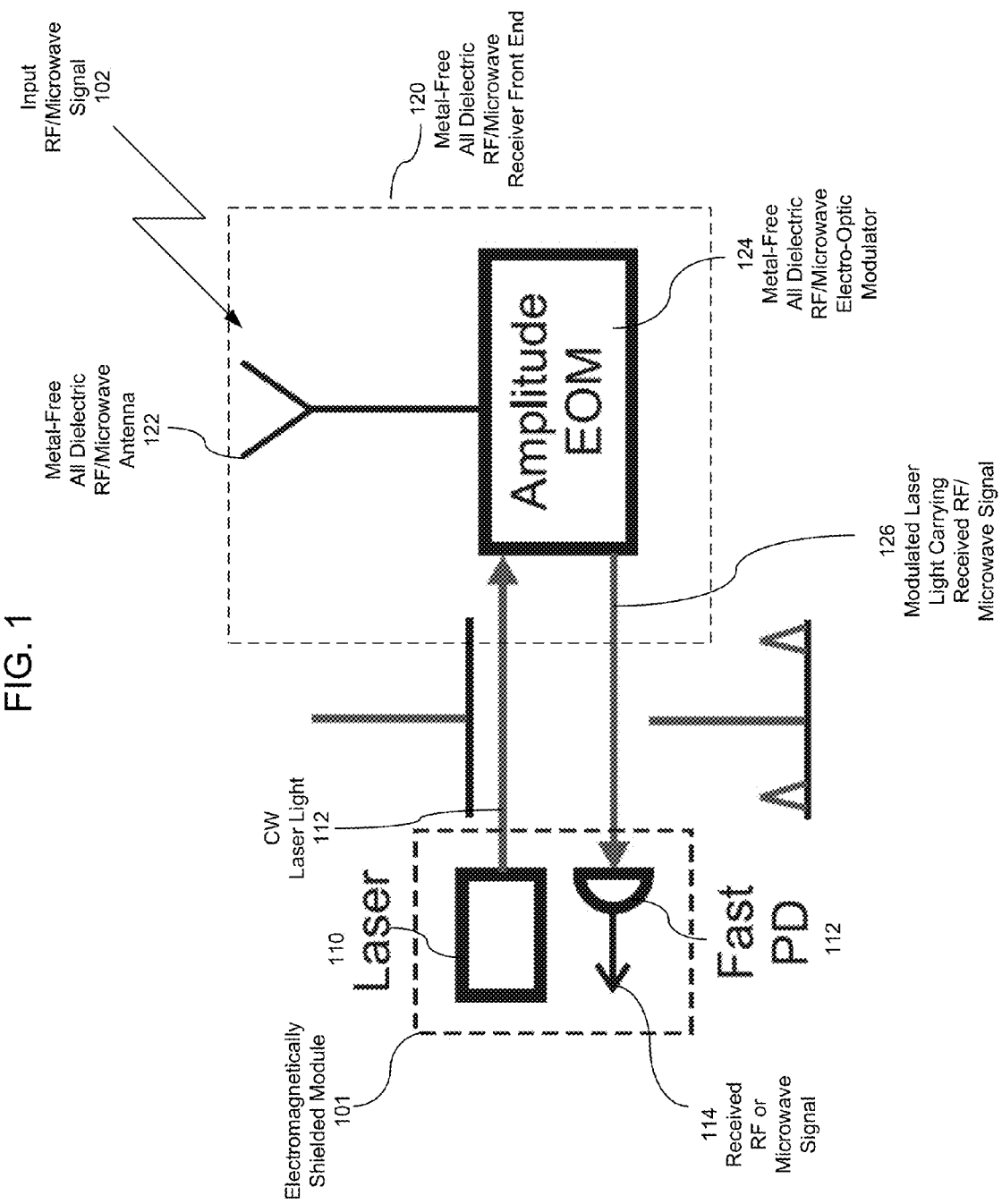
FIG. 1 illustrates an example of an RF or microwave system having a metal-free, all dielectric receiver front end and an electromagnetically shielded module.

FIG. 1 illustrates an example of an RF or microwave system having a metal-free, all dielectric receiver front end 120 and an electromagnetically shielded module 101. The dielectric receiver front end 120 for receiving RF or microwave signals includes a metal-free, all dielectric antenna 122 for receiving an input RF or microwave signal 102 from the air, and a metal-free, all dielectric RF or microwave electro-optic modulator 124. The antenna 122 is electromagnetically coupled to the modulator 124 to direct the received signal 102 to the modulator 124. Continuous wave laser light 112 is fed into the modulator 124 which modulates the CW laser light 112 in response to the received signal 122 to produce modulated light 126 that carries the received signal 122. The modulated light 126 produced by the modulator 124 is directed via an all dielectric waveguide or free space to the electromagnetically shielded module 101 for processing.

As illustrated, an optical detector 112, e.g., a high-speed photodiode, is provided in the module 101 to receive the modulated laser light 126 and converts the received light into an electrical signal 114 that carries or represents the received RF or microwave signal 102 at the antenna 122. The optical detector 112 and the subsequent electronic circuitry for signal processing are shielded to ensure their proper operations. A laser 110 that produces the CW laser light 112 can also be included in the module 101 and thus shielded from electromagnetic interference or damage.

In implementations, the metal-free, all dielectric receiver front end 120 can include an all-dielectric RF waveguide free of a metal that is connected between the antenna 122 and the modulator 124 to guide the received RF or microwave signal 102. This all-dielectric RF waveguide can include a first waveguide end that receives the RF signal 102 from the antenna 122 and a second waveguide end to which the received RF signal 102 is guided. The all dielectric receiver front end 120 includes an all-dielectric RF resonator free of a metal that is electromagnetically coupled to the second waveguide end of the all-dielectric RF waveguide to receive and store RF energy of the RF signal 102. An optical resonator, which is formed of a dielectric material exhibiting an electro-optic effect and free of a metal, is positioned relative to the all-dielectric RF resonator to be exposed to RF energy stored by the all-dielectric RF resonator. As illustrated by examples below, the optical resonator can be either located inside the RF resonator or outside the RF resonator. Notably, the modulator 124 is formed from this optical resonator without any metal parts to apply the RF signal 102. Instead, the RF signal 102 is directly coupled to the optical resonator by being physically located within the field of the RF signal 102. An optical coupling device is provided to couple the CW laser light 112 into the optical resonator to mix the CW light 102 with the RF energy to cause optical modulation of the CW light 102 based on the electro-optic effect to produce modulated light 126 that carries the RF signal 102. An all-dielectric optical waveguide, such as optical fiber, can be used to receive the modulated light 126 from the optical resonator 124 and to guide the modulated light 126 away from the optical resonator 124 to the RF protected or shielded optical detector 112. The optical detector 112 receives the modulated light 126 from the all-dielectric optical waveguide and converts the modulated light 126 into the electrical signal 114 representing the RF signal 102.

Specific examples for the above all-dielectric RF or microwave photonic receiver are described based on optical whispering gallery mode resonator technology. The operational principle of the front-end system involves mixing of the RF signal of interest and coherent light by means of an electro-optic mixer (electro-optic modulator). The mixer is all-dielectric. The RF field is concentrated with a dielectric antenna to increase the mixing efficiency. The RF signal is imposed to the optical carrier (the light is modulated with the RF signal) as the result of the mixing. The modulated light is sent along a dielectric waveguide to an RF protected chamber to be demodulated on a photodiode and processed further. Electro-optic whispering gallery mode (WGM) microresonators in the described examples are used as a mixer of the RF signal and the light in the reported previously design of the all-dielectric receiver. Other electro-optic optical resonators or electro-optic materials or devices can also be used to provide the desired electro-optic modulation. In one example, a cylindrical RF antenna is proposed for the concentration of the RF signal. To achieve the mixing the WGM electro-optic resonator has to be placed within the antenna body. One of the basic problems of the integration of the microresonator mixer and the antenna is the significant difference of their sizes. The geometrical size of the RF field localization within the antenna could exceed significantly the size of the resonator which leads to the increased phase mismatch between the RF and the optical fields. Reduction of the phase matching of the fields results in the inefficient mixing of the RF and light and, hence, leads to the reduction of the overall sensitivity of the RF reception.

Several exemplary configurations of all-dielectric photonic receivers are provided below to provide efficient RF reception. For example, tapered waveguides of various morphologies can be used to produce high concentration of the RF radiation in the vicinity of the optical WGM resonator. The increased RF concentration not only improves the gain of the antenna with respect to the developed previously cylindrical antenna, but also improves the phase matching between the RF and the light resulting in enhanced field mixing efficiency. A properly phase matched taper can be attached to a cylindrical antenna to improve the coupling with the WGM resonator.

The techniques described in this document can be used to provide a dielectric structure that is able to focus RF radiation into an RF resonator having dimensions comparable with those of the optical WGM resonator. The RF modes of the dielectric resonator should be phase matched with the optical WGM modes for better frequency mixing. All the dielectric parts should be RF transparent. The primary RF attenuation in the structure should come from the interaction of light and RF radiation. The electromagnetic power will not be absorbed in the structure and will go through the structure without causing damage and only a small part of the electromagnetic power will be upconverted to the optical frequency. One limitation for the concentration efficiency of the RF structure (antenna gain) is the intrinsic damage of the material with the high power RF radiation.

The morphology of a dielectric microwave antenna utilized with an all-dielectric microwave photonic receiver front-end can be designed to provide sufficient electro-magnetic field concentration to achieve high reception sensitivity. A dielectric resonator antenna that relies upon conventional diffraction-limited high-Q microwave modes does not provide the required enhancement of the microwave signal. On the other hand, near-field concentrators of microwave radiation result in achieving sensitivity levels comparable to the sensitivity of conventional electronic receivers.

RF field concentration is inherently smaller in all-dielectric receivers when compared with conventional metallic electronic receivers, so efficient electro-optical mixers are required to make the all-dielectric technology usable. The proposed all-dielectric receivers in this document can use electro-optically active crystalline whispering gallery mode (WGM) resonators due to their high quality (Q) factors resulting in high mixing efficiency. WGM RF photonic mixers are promising for practical applications because their performance fundamentally does not depend on the RF frequency. Nonlinear WGM resonators can be used in photonic front-end receiver applications operating in the frequency bands ranging from X-band to Ka-band. In general, WGM-based mixers operate well at RF frequencies ranging from several GHz to 1 THz. The all-dielectric receiver configurations considered in this document tend to be robust at high RF and microwave frequencies due to the use of all-dielectric waveguides and components.

The phenomenon of three-wave mixing in a solid state resonator possessing quadratic nonlinearity is the physical basis for the operation of the resonant photonic mixer. An RF signal is sent into an RF resonator with a mode that geometrically overlaps the modes in the optical resonator. The pump light interacts with the RF radiation creating optical harmonics at frequencies corresponding to the sum and/or difference of the optical and RF carrier frequencies. The optical harmonics mix with the RF signal and create new harmonics. The process occurs if the phase matching condition is fulfilled and if there are optical modes to host the generated harmonics. Naturally, the operation bandwidth of the mixer is restricted by the spectral width of optical and RF resonances.

Examples described in this document separate the dielectric antenna and the RF resonator that interacts with the photonic electro-optic mixer to provide flexibility in tuning the system, and significant enhancement in the sensitivity of the receiver. The sensitivity increases because of larger, sub-wavelength, concentration of the RF field that enhances the electro-optic process in the dielectric photonic mixer. This is in part because the structural requirements for efficiently receiving an RF or microwave signal tend to be different from structural requirements for storing and spatially concentrating the energy of the RF or microwave signal in the RF resonator. Separation of the dielectric antenna and the RF resonator allows for separately configuring the dielectric antenna and the RF resonator to meet their different structural requirements.

In receivers based on resonant photonic mixers the information carried by the RF signal is retrieved by means of processing and detecting the optical harmonics leaving the optical resonator. WGM-based photonic mixers have a significant practical shortcoming. Their bandwidth is usually less than a few megahertz. Such a narrow bandwidth value restricts the number of applications of the devices. An increase of the bandwidth at the expense of the optical Q-factor results in a decrease of the mixing efficiency proportionally to $Q^2$. This is generally unacceptable because increase of the mixing bandwidth from, say, 5 MHz to 500 MHz leads to increased sensitivity loss by a factor of $10^4$, which is too large for many applications. Thus another goal of the present contribution is to assess the properties of resonant photonic mixers and to find a way for utilization of extremely high-Q WGM resonators that allows achieving high mixing efficiency on the one hand, and maintaining a comparably large mixing bandwidth, on the other. For this purpose, we consider using two optical modes in the mixer, one of which possesses very-high and the other—comparably low Q-factors. The immediate bandwidth of such a mixer is given by the low-Q mode, while the high-Q mode results in increased mixer efficiency.

Figure 2:
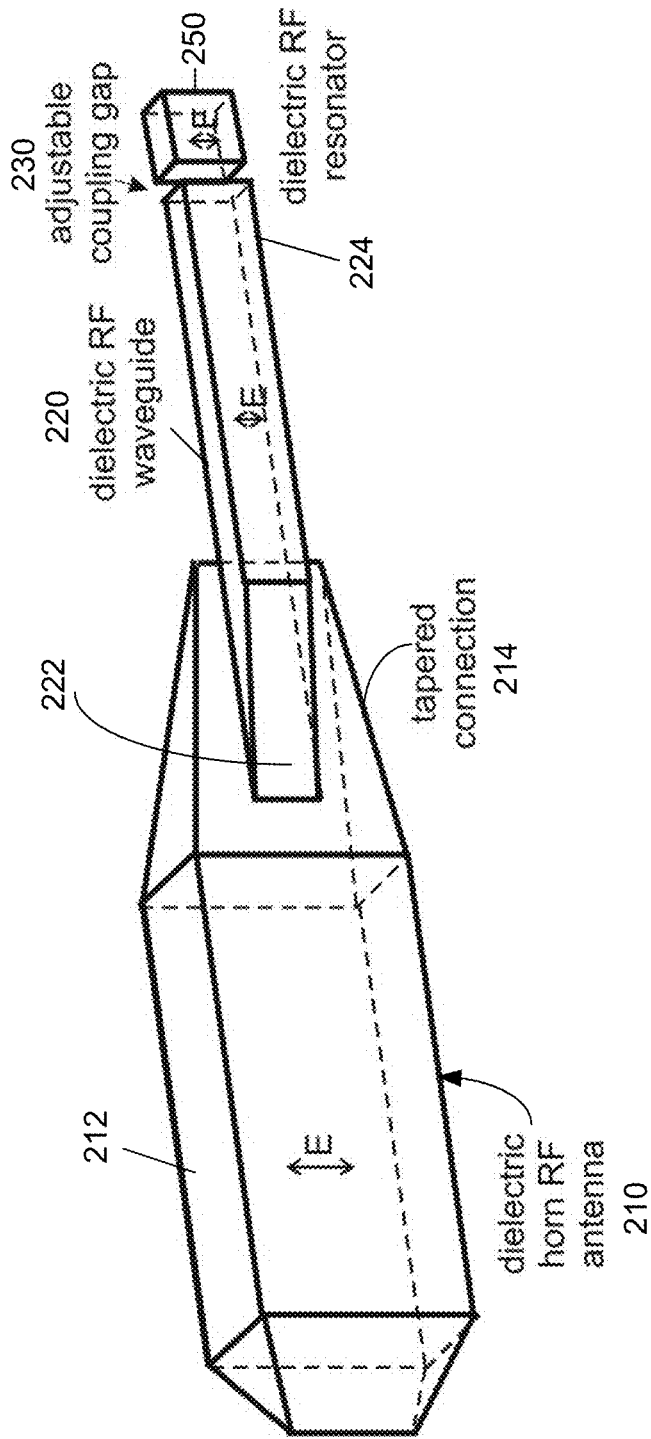
FIG. 2 shows an example of a metal-free, all dielectric receiver front end having an all-dielectric RF antenna, an all-dielectric RF waveguide and an all-dielectric RF resonator.

FIG. 2 shows a metal-free, all dielectric receiver front end having an all-dielectric RF antenna, an all-dielectric RF waveguide and an all-dielectric RF resonator. This is an example for an RF field concentrator in spatially separated antenna and mixer configuration. Field enhancement can be increased if the RF signals propagating in free space are properly concentrated and the RF mixer is inserted into the concentrator. The enhancement is also possible if the receiver front-end and the antenna are separated in space. Such a configuration can be more preferable in practical applications because it allows independent tuning of the antenna and the receiver front-end.

In FIG. 2, the horn RF antenna 210 is a tapered dielectric RF antenna structured to receive an input RF signal and to include a tapered waveguide 214 that has a larger first end that receives the received input RF signal and a smaller second end, and a tapered waveguide section connected between the larger first end and the smaller second end and structured to have a cross section that reduces from the larger first end to the smaller second end and focuses the received input RF signal towards the smaller second end. A narrow dielectric RF waveguide 220 is provided to include a first tapered tip that is electromagnetically coupled to the smaller second end of the tapered dielectric RF antenna 210 to receive the input RF signal and a narrow dielectric RF waveguide section connected to the first tapered tip to guide the RF input signal away from the first tapered tip. A dielectric RF resonator 250 is electromagnetically coupled to the narrow dielectric RF waveguide section via an adjustable coupling gap 230 to receive the input RF signal and is structured to be in resonance with the received the RF input signal.

In FIG. 2, the dielectric horn antenna can be made from an RF transparent material with a low dielectric constant. Expected cross-section of the horn part has dimensions 2.5-3.0×0.5 cm if detection of 10 GHz RF signals is desired and the susceptibility of the horn host material is approximately 2. The horn part is tapered to achieve efficient coupling with a high index dielectric waveguide. The expected dimensions of the waveguide are ~8×1 mm, assuming the same signal frequency and susceptibility on the order of 40. The waveguide is coupled with a dielectric RF resonator with dimensions ~8×8×1 mm. The configuration of the system dictates the polarization of the electric field supported by the waveguide (shown by arrows). The horn antenna 210 tightly focuses the RF radiation and forwards it to the narrow dielectric waveguide 220 coupled to the RF dielectric resonator 250 made from the same material. The tuning of the coupling efficiency of the waveguide and the resonator (loading of the resonator) is achieved with an adjustable coupling gap 250. Final resonator dimensions are comparable with the dimensions of the WGM mixer (WGM resonator will have 2-0.1 mm diameter and 100-10 microns in thickness).

The dielectric horn antenna 210 has an opening area $A_a$ that is impedance matched with free space at one side and with a dielectric waveguide resonator at the other side ($A_w$ cross-section, $\rho_w$ is the resistance, $n_{RF}$ is the refractive index, and F is the finesse of the resonator). Comparing the power flow entering the antenna ($|E_{RF\ in}|^2 A_a/(2\eta_0)$, $\eta_0 = \sqrt{\mu_0/\epsilon_0}$ is the resistance of vacuum) and the power flow entering the resonator ($|E_\omega|^2 A_\omega n^2_{RF}/(2\eta_0)$) can be used to find the maximal RF field enhancement coefficient to be independent of the refractive index of the RF resonator material:

$$\tilde{\beta}' = \sqrt{\frac{A_a}{A_w}} \frac{\sqrt{\mathcal{F}}}{\sqrt{\pi}\, n^2_{WGM}}. \tag{4}$$

Our study suggests that direct antenna/slot configuration is equivalent to the ideal horn/waveguide/resonator/slot configuration with horn area $A_a = A_w n^2_{RF}$. The maximal sensitivity of the ideal receiver with the field concentrator exceeds the sensitivity of a receiver based on an RF antenna which also serves as an RF resonator if $A_a/A_w > n^2_{RF}$. This condition can be implemented since the effective cross-section area of a dielectric waveguide resonator can be made smaller than the diffraction limit $(\lambda_{RF}/2n_{RF})^2$ and the area of the antenna cross-section can significantly exceed $(\lambda_{RF}/2)^2$.

It is known that a slot waveguide can be used for increasing the amplitude of the electromagnetic field $(n_w/n_{slot})^2$ times $(n_w \gg n_{slot})$. The field is strongly enhanced in the low index region near the interfaces because of the field discontinuity at the high index contrast interfaces. The power of the field in the low index area is enhanced as well. Changing the waveguide cross-section shape from rectangular to bowtie leads to further field localization and enhancement so that the mode volume reduces to approximately $0.1(\lambda/2n)^3$, where $\lambda$ is the optical wavelength and n is the optical index of refraction.

Applying the result to the RF train in FIG. 2, it is found that the cross-section area of the dielectric waveguide resonator can be as small as $0.1(\lambda_{RF}/2n_{RF})^2$. For $A_a=10$ cm$^2$ and with other parameters same as defined above, The field enhancement coefficient $\beta'=10$. This value is significantly larger than the value obtained for a receiver based on an RF antenna which also serves as an RF resonator. Our investigation suggests that the all dielectric RF photonic link in FIG. 2 can have performance similar to that of metal-containing RF links.

In FIG. 2, the RF resonator 250 is coupled to an electro-optic optical resonator or an electro-optic material to provide the RF/microwave to optical conversion via optical modulation of CW laser light. As an example, the electro-optic optical resonator can be an optical whispering gallery mode (WGM) resonator formed of an electro-optic material and located to be in electromagnetic coupling to the dielectric RF resonator to receive the RF input signal that interacts with the electro-optic material to cause an electro-optic modulation of light in one or more WGM modes inside the optical WGM resonator so that the modulated light carries the input RF signal.

Figure 3:
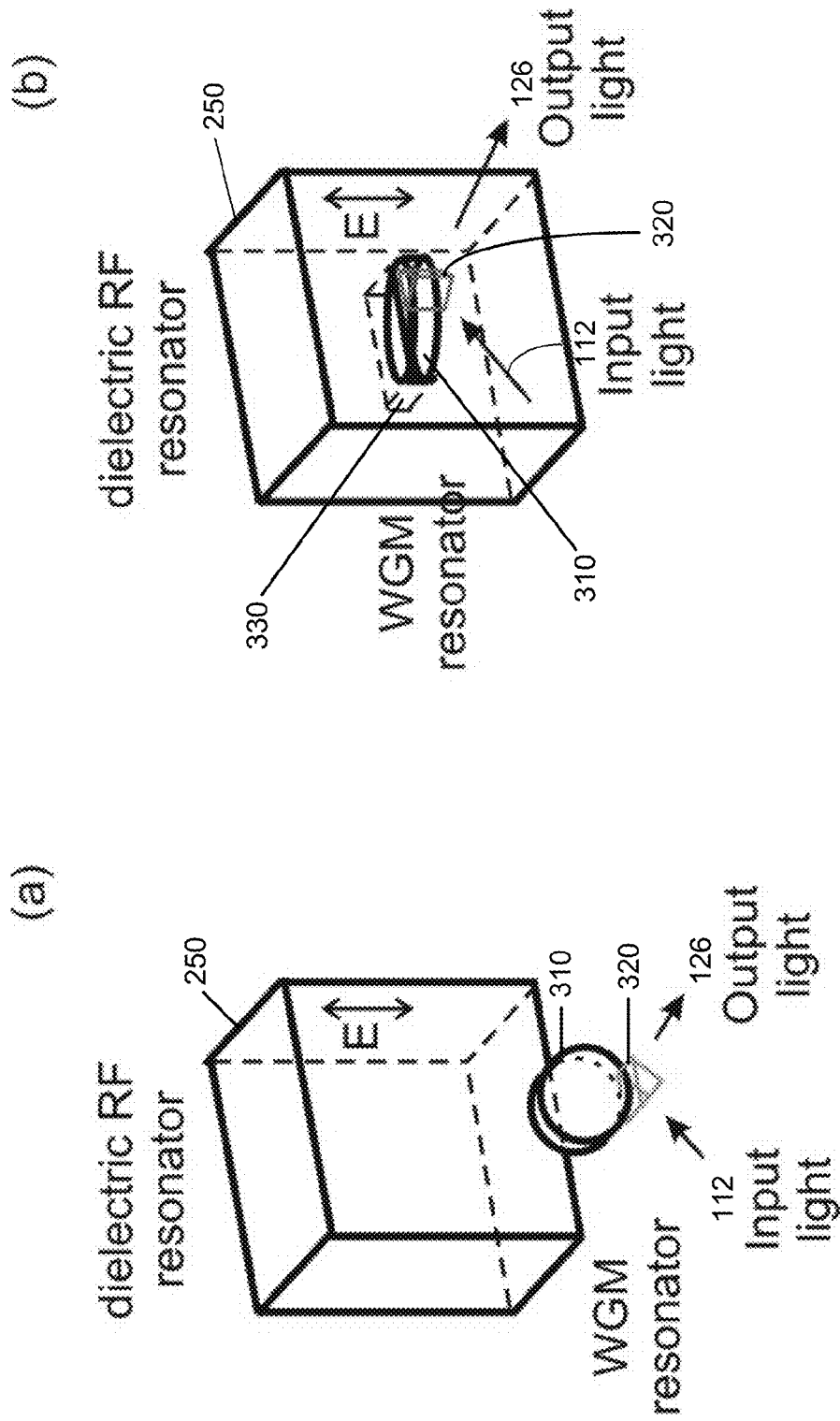
FIG. 3 shows two examples for coupling a metal-free, all dielectric optical resonator made of an electro-optic material to a metal-free, all-dielectric RF resonator.

FIG. 3 shows two examples for coupling a metal-free, all dielectric optical resonator made of an electro-optic material to a metal-free, all-dielectric RF resonator. Because the RF resonator 250 supports linearly polarized RF radiation, the relative position of the RF and optical WGM resonators can affect the device performance.

FIG. 3(a) shows a first coupling configuration of the RF and optical resonators where the RF field is perpendicular to the axis of the WGM resonator. The WGM resonator 310 is placed outside and adjacent to the RF resonator 250 and is exposed to the RF field stored in the RF resonator 250. An optical coupler 320, e.g., a prism evanescent coupler, is used to couple the CW laser light 112 into the WGM resonator 310 and to couple the modulated light 126 out of the WGM resonator 310. FIG. 3(b) shows a second coupling configuration of the RF and optical resonators RF field is parallel to the WGM resonator axis. The dimensions of the RF resonator can be adjusted to increase the coupling of the light and RF radiation without loss of the antenna gain due to the separation of the RF antenna and the RF resonator in this design. Separation of the RF antenna and the RF resonator allow for connecting the large enough RF antenna and a small RF resonator with a properly made RF waveguide.

Figure 4:
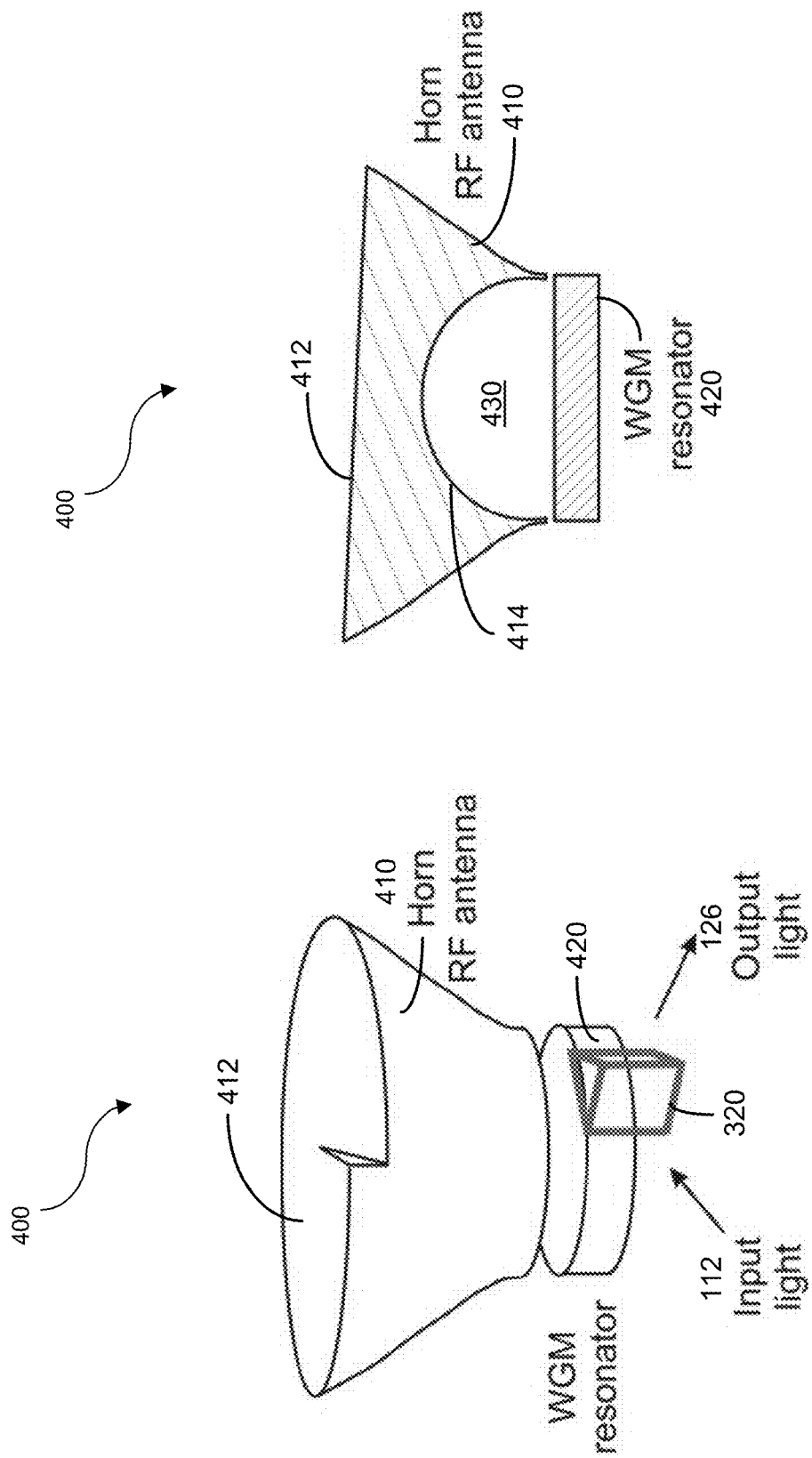
FIG. 4 shows an example of a metal-free, all dielectric receiver front end having an all-dielectric RF antenna that is directly coupled to an all-dielectric optical resonator made of an electro-optic material.

FIG. 4 shows an example of a metal-free, all dielectric receiver front end having an all-dielectric RF antenna 410 that is directly coupled to an all-dielectric optical resonator 420 made of an electro-optic material. In this example, the RF antenna 410 is a horn antenna that transfers an RF plane signal wave into a wave possessing a proper orbital momentum that provides the desired phase matching between the light and the RF field. The antenna 410 has a notch on its top 412. The height of the notch is equal to RF/nRF. Such a structure transfers a plain RF wave into the wave with orbital momentum equal to "1". As the result, the RF wave at the end of the horn antenna 410 enables efficient nonlinear interaction of the RF signal and the optical WGMs. The WGM resonator 420 and the horn antenna 410 are coupled through RF evanescent field. Optical WGMs are not influenced by the antenna 410 because their evanescent field is much shorter compared with the RF evanescent waves. FIG. 4 further shows on the right hand side an example of the cross-section of the antenna 410 with a cavity 430 at the end next to the WGM resonator 420 due to the concave end surface 414 for outputting the RF signal. The cavity 430 is created to concentrate the RF field in the vicinity of the optical field localization at the WGM resonator 420.

It is known that creating a special phase grating at the top of a dielectric cylinder allows transforming a plain electromagnetic wave into a Bessel beam (a wave with a nonzero orbital momentum). The wave with a nonzero orbital momentum can be used to realize an efficient wave mixing between the RF wave and the light waves having cylindrical symmetry. The orbital momentum of the RF wave interacting with WGMs along the entire rim of the WGM resonator should be equal to the difference of the orbital momentum of the pumping WGM and the modulation sideband WGM. The particular example of the horn RF antenna in FIG. 4 shows the possible modulation at the adjacent WGM modes belonging to the same mode family. The basic distinctive feature of the RF horn antenna is its ability to focus RF radiation exactly at the point of localization of the optical field of the WGM mixer. The phase grating can be made in different ways. For instance, it could be a thin film grating placed on the top of the horn.

Hence, the example in FIG. 4 is a device that includes a tapered dielectric RF antenna structured to have an input end with a large cross section that receives an input RF signal and an output end with a small cross section smaller that the large cross section, and a tapered waveguide horn section connected between the input end and the output end and structured to have a cross section that reduces from the input end to the output end to guide the input RF signal to the output end. The output end is structured to have a concave opening to form a cavity or notch for outputting the input RF signal. An optical whispering gallery mode (WGM) resonator is formed of an electro-optic material and is located outside the second end of the tapered dielectric RF antenna to directly receive the RF input signal from the second end to cause an electro-optic modulation of light in one or more WGM modes inside the optical WGM resonator based on interaction between the received input RF signal and the light in the electro-optic material so that the modulated light carries the input RF signal. In implementations, the optical WGM resonator can be structured to be axially or cylindrically symmetric around an optic axis of the electro-optic material around which the WG modes circulate in a circular path or the equator, and the optical WGM resonator can be oriented to have the optic axis in alignment of an axis of the a tapered waveguide horn section of the tapered dielectric antenna. In implementations, a phase grating can be formed on the input end to cause the input RF signal to have a nonzero momentum at the optical WGM resonator.

Figure 5:
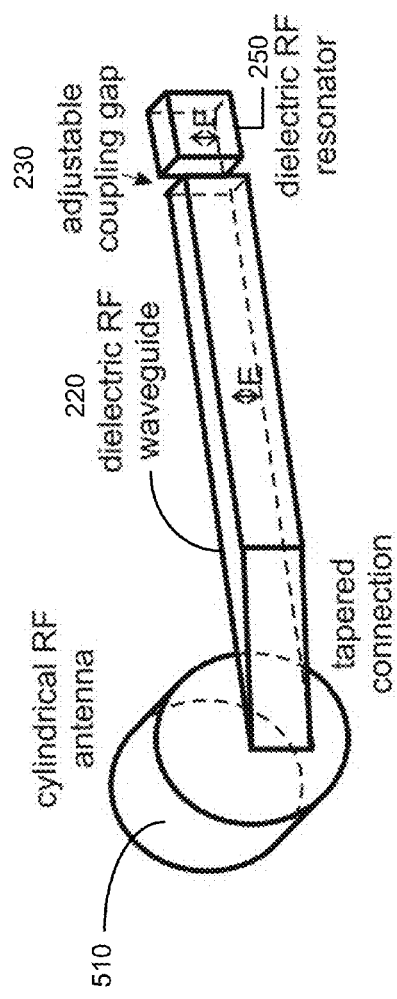
FIGS. 5 and 6 show two examples of metal-free, all dielectric receiver front ends each having an all-dielectric RF antenna, an all-dielectric RF waveguide and an all-dielectric RF resonator.
Figure 6:
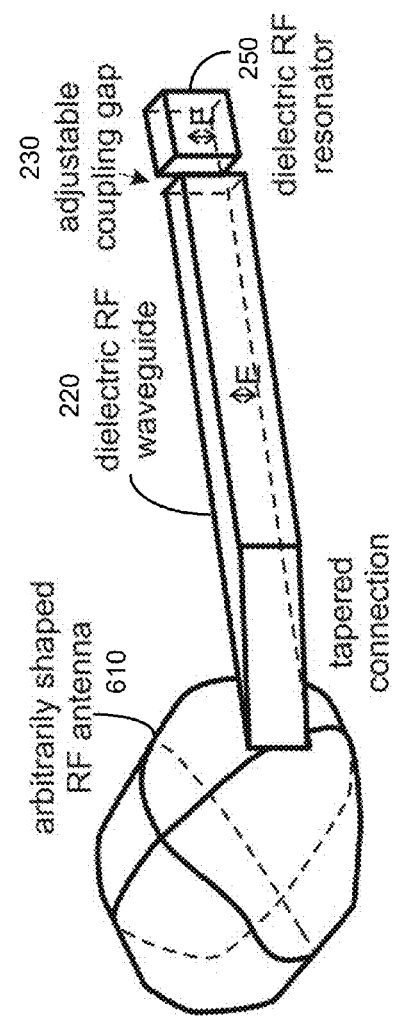

FIGS. 5 and 6 show two examples of metal-free, all dielectric receiver front ends each having an all-dielectric RF antenna, an all-dielectric RF waveguide and an all-dielectric RF resonator. FIG. 5 shows a dielectric tapered waveguide is used to connect a cylindrical dielectric RF antenna 510 and the RF resonator phase matched with the optical modes in the WGM resonator. This design can be extended to any shape of dielectric antenna 610 in FIG. 6.

FIGS. 7 and 8 show two examples of metal-free, all dielectric RF resonators shaped to concentrate the RF field within a small volume. Such all-dielectric RF resonators can be structured to achieve concentration of RF field better than the diffraction limit $(\lambda_{RF}/2n_{RF})^3$, where $\lambda_{RF}$ is the wavelength of the RF signal in the vacuum, and $n_{RF}^2$ is the dielectric susceptibility of the material. Such RF resonators can be used to enhance sensitivity of dielectric metal-free front-end photonic RF receivers Optical processing of RF signals generally involves electro-optical modulators for upconversion of the RF field to the optical domain. The efficiency of the upconversion, that determines the performance of the RF photonic devices, critically depends on the concentration of the RF signal in an electro-optical material used for the upconversion. Metallic electrodes allow achieving strong concentration of the RF field to the dimensions much less compared with the wavelength of the RF radiation in the material. Strong concentration of the RF radiation becomes an issue in the case of technical requirements prohibiting usage of metal in the photonic devices. Dielectric RF resonators generally have mode volume exceeding $(\lambda_{RF}/2n_{RF})^3$, where $\lambda_{RF}$ is the wavelength of the RF signal in the vacuum, and $n_{RF}^2$ is the dielectric susceptibility of the material. The described here RF resonators are macroscopic structures with microscopic mode volumes. The volume of the RF mode of the proposed here resonator can be as small as the volume achieved in the metal strip-line RF resonators.

The resonator designs in FIGS. 7 and 8 are designed to use an RF dielectric resonator where high field concentration results from the electromagnetic flow conservation law. In FIG. 7, the dielectric RF resonator 700 includes a first tapered waveguide side 710 that has a larger first end and a smaller second end, and a tapered waveguide section 712 connected between the larger first end and the smaller second end and structured to have a cross section that reduces from the larger first end to the smaller second end. The dielectric RF resonator 700 includes a second tapered waveguide side 720 that has a larger second end and a second tapered waveguide section connected to the larger second end and structured to (1) have a cross section that reduces from the larger second end and (2) connect to the smaller second end to form a waist section 730 where the RF field is concentrated in a small volume. An optical resonator can be located to interact with the RF signal at the waist section 730 of the dielectric RF resonator 700.

In FIG. 8, the dielectric RF resonator 800 includes a dielectric cylindrical disk 810 shaped to include a hollow cylindrical void 820 with a symmetric axis 822 inside the dielectric cylindrical disk 810 and off center from a symmetric axis 811 of the dielectric cylindrical disk 810 to form a narrow dielectric material section 830 near an external side surface of the dielectric cylindrical disk 810. This narrow dielectric material section 830 is the location where the RF field is tightly concentrated. The optical resonator can be located to interact with the RF signal at the narrow dielectric material section 830 near the external side surface of the dielectric cylindrical disk 810.

Numerical simulations were performed for the resonator shown in FIG. 7 and suggested that the RF mode having 10 GHz carrier frequency ($\lambda_{RF}$=3 cm) can have mode volume of the order of $10^{-6}$ cm$^3$ if the resonator is made out of material with $n_{RF}$~10. The quality factor of the resonator exceeds 30. Those parameters are comparable with the field concentration parameters of a resonator made with usage of strip line.

Figure 9:
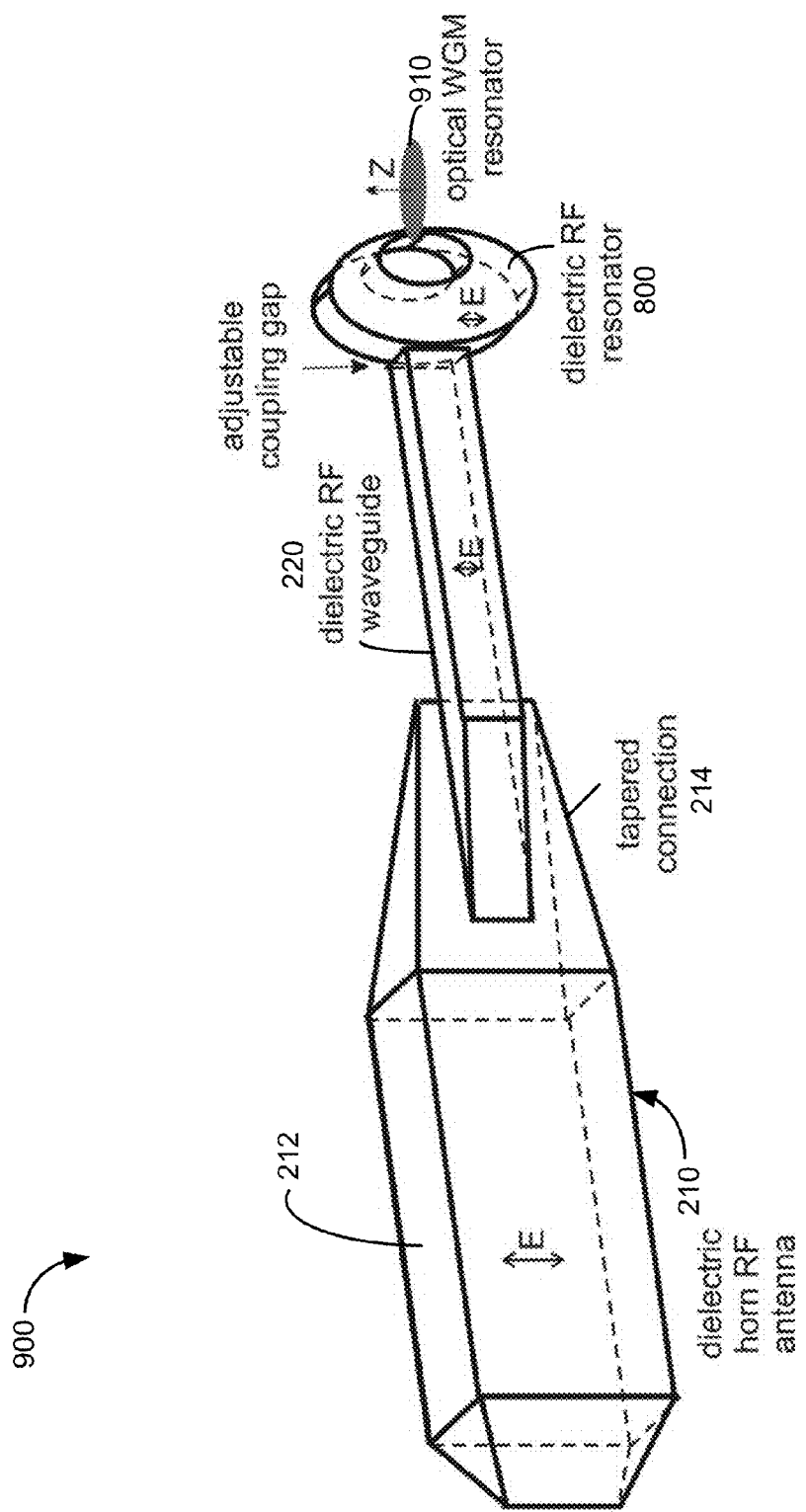
FIG. 9 shows an example of a metal-free, all dielectric receiver front end having an all-dielectric RF antenna, an all-dielectric RF waveguide and an all-dielectric RF resonator based on the RF resonator design in FIG. 8 for coupling to an optical resonator.

FIG. 9 shows an example of a metal-free, all dielectric receiver front end having an all-dielectric RF antenna, an all-dielectric RF waveguide and an all-dielectric RF resonator based on the RF resonator design in FIG. 8 for coupling to an optical resonator 910. This design inserts an electro-optically active element, e.g. lithium niobate/tantalate whispering gallery mode (WGM) resonator 910, into the area of the largest concentration of the RF field of the RF resonator 800. Though the resonator by itself is an efficient RF antenna, an additional dielectric horn antenna can provide further enhancement of the RF field concentration. Because the field concentration is large, the modulation and upconversion of the RF signal to the optical domain is very efficient. The dielectric horn antenna is made out of RF transparent material with a low dielectric constant. The waveguide is coupled with the dielectric RF resonator via evanescent field. The configuration of the system dictates the polarization of the electric field supported by the waveguide (shown by arrows). Electro-optical WGM resonator is inserted into the RF resonator.

Based on the above examples, the RF field concentration in an all-dielectric photonic link can approach the field concentration in the conventional RF photonic links. To create efficient RF photonic mixing to realize a high performance system, a photonic mixer can be configured based on single-sideband (SSB) electro-optic modulator (EOM) to achieve high sensitivity in the all-dielectric microwave photonic receiver. The basic advantage of the SSB EOM is in its ability to create coupling between WGMs having different quality factors; this results in a photonic link/receiver configuration having resonantly enhanced sensitivity and wider reception bandwidth. The operation of the photonic mixer is based on the RF and optical wave mixing in a solid state WGM resonator possessing a quadratic nonlinearity. An RF signal is fed into an RF waveguide or resonator to interact with the optical resonator, which is pumped with continuous wave laser light. The pumping light is mixed with RF radiation generating an optical harmonic at a frequency corresponding either to the sum or to the difference of the optical and RF carrier frequencies. Wave mixing occurs if phase matching condition is fulfilled and if there are optical modes to support generated modulation side-bands. The optical spectrum of the resonator determines the sideband frequency shift with respect to the carrier (if the generated optical sideband has higher or lower frequency with respect to the carrier). For SSB modulation, only two optical modes participate in the interaction. The nondiagonal elements of the linear electro-optic tensor introduce a coupling between TE and TM WGMs, if the shape of the microwave electrode applied to an electro-optic WGM resonator is properly designed, and the resonator is made out of a proper material.

In one implementation, a whispering gallery mode optical resonator based photonic device is provided to include a single sideband modulator and a frequency control mechanism. The single sideband modulator includes an optical resonator made of an electro-optic crystal and structured to support optical whispering gallery modes in a first polarization mode and a second polarization mode orthogonal to the first polarization mode, both of which circulate near a rim of the optical resonator, and electrodes formed on the optical resonator to receive an RF or microwave signal to the optical resonator in an electric field polarization oriented relative to a crystal axis of the electro-optic crystal to effectuate coupling between an optical whispering gallery mode in the first polarization mode and another optical whispering gallery mode in the second polarization mode to produce an optical single sideband by modulation of continuous wave light at an optical carrier frequency at a sideband frequency different from the optical carrier frequency. The frequency control mechanism is coupled to the optical resonator to tune a frequency spacing between the optical single sideband and the optical carrier frequency. Examples of SSB modulators based on WGM resonators with electrodes are described in U.S. application Ser. No. 12/618,704 entitled "TUNABLE SINGLE SIDEBAND MODULATORS BASED ON ELECTRO-OPTIC OPTICAL WHISPERING GALLERY MODE RESONATORS AND THEIR APPLICATIONS" and filed on Nov. 13, 2009, which is incorporated by reference as part of this document. The SSB can be implemented in electro-optic resonators described in this document in absence of metal electrodes.

While this document contains many specific implementation details, these should not be construed as limitations on the scope of the invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Only a few implementations are disclosed. Variations, modifications and enhancements of the disclosed implementations and other implementations can be made based on what is described and illustrated in this document.

What is claimed is:

1. A method for receiving a radio frequency (RF) signal, comprising:
    using an all-dielectric RF antenna free of a metal to wirelessly receive an RF signal;
    coupling the RF signal received by the all-dielectric RF antenna into an all-dielectric RF waveguide free of a metal to guide the received RF signal away from the all-dielectric RF antenna;
    coupling the received RF signal in the all-dielectric RF waveguide into an all-dielectric RF resonator free of a metal that stores RF energy of the received RF signal that is coupled into the all-dielectric RF resonator;
    exposing an electro-optic material, which is free of a metal and exhibits an electro-optic effect, to the RF energy stored by the all-dielectric RF resonator;
    coupling continuous wave (CW) light into the electro-optic material to mix the CW light with the RF energy stored by the all-dielectric RF resonator to cause optical modulation of the CW light to produce modulated light that carries the RF signal; and
    processing the modulated light to extract the RF signal.

2. The method as in claim 1, comprising:
    directing the modulated light produced by mixing the CW light with the RF energy stored by the all-dielectric RF resonator in the electro-optic material along a dielectric waveguide to an RF protected chamber in which the modulated light is processed to extract the RF signal.

3. The method as in claim 2, comprising:
    using a photodiode inside the RF protected chamber to convert the modulated light into an electrical signal in extracting the RF signal.

4. The method as in claim 1, comprising:
    placing the electro-optic material inside the all-dielectric RF resonator to expose the electro-optic material to the RF energy stored by the all-dielectric RF resonator.

5. The method as in claim 1, comprising:
    placing the electro-optic material outside the all-dielectric RF resonator to be adjacent to the all-dielectric RF resonator to expose the electro-optic material to the RF energy stored by the all-dielectric RF resonator.

6. The method as in claim 1, wherein:
    the electro-optic material is in an optical resonator.

7. The method as in claim 6, wherein:
    the optical resonator is a whispering gallery mode optical resonator.

8. The method as in claim 1, comprising:
    making the all-dielectric RF antenna to have a tapered structure.

9. The method as in claim 8, comprising:
    making the all-dielectric RF antenna to include a tapered waveguide that has a larger first end that receives the received RF signal and a smaller second end, and a tapered waveguide section connected between the larger first end and the smaller second end and structured to have a cross section that reduces from the larger first end to the smaller second end and focuses the received RF signal towards the smaller second end.

10. The method as in claim 9, comprising:
    making the all-dielectric RF waveguide to include a first tapered tip that is electromagnetically coupled to the smaller second end of the tapered dielectric RF antenna to receive the input RF signal and a narrow dielectric RF waveguide section connected to the first tapered tip to guide the RF input signal away from the first tapered tip.

11. The method as in claim 1, comprising:
    separating the all-dielectric RF resonator from the all-dielectric RF waveguide by a gap; and
    adjusting the gap to control coupling of the received RF signal in the all-dielectric RF waveguide into the all-dielectric RF resonator.

12. The method as in claim 1, comprising:
    making the all-dielectric RF antenna to have a horn structure with a tapered shape that reduces in dimension towards the all-dielectric RF resonator.

13. The method as in claim 1, comprising:
    structuring the all-dielectric RF antenna to efficiently receive the RF signal from the air; and
    independently structuring the all-dielectric RF resonator to concentrate the RF energy in a small volume for efficient coupling with the electro-optic material.

14. The method as in claim 13, comprising:
    structuring the all-dielectric RF resonator to include:
        a first tapered waveguide side that has a larger first end and a smaller second end, and a tapered waveguide section connected between the larger first end and the smaller second end and structured to have a cross section that reduces from the larger first end to the smaller second end; and
        a second tapered waveguide side that has a larger second end and a second tapered waveguide section connected to the larger second end and structured to (1) have a cross section that reduces from the larger second end and (2) connect to the smaller second end to form a waist section,
    wherein the electro-optic material is located to interact with the RF signal at the waist section of the all-dielectric RF resonator.

15. The method as in claim 13, comprising:
    structuring the all-dielectric RF resonator to include:
        a dielectric cylindrical disk shaped to include a hollow cylindrical void inside dielectric cylindrical disk and off center from a symmetric axis of the dielectric cylindrical disk to form a narrow dielectric material section near an external side surface of the dielectric cylindrical disk; and,
    wherein the electro-optic material is located to interact with the RF signal at the narrow dielectric material section near the external side surface of the dielectric cylindrical disk.

16. A device for receiving a radio frequency (RF) signal, comprising:
- an all-dielectric RF waveguide free of a metal including a first waveguide end that receives an RF signal and a second waveguide end to which the received RF signal is guided;
- an all-dielectric RF resonator free of a metal that is electromagnetically coupled to the second waveguide end of the all-dielectric RF waveguide to receive and store RF energy of the RF signal;
- an optical resonator, which is formed of a dielectric material exhibiting an electro-optic effect and free of a metal, positioned relative to the all-dielectric RF resonator to be exposed to RF energy stored by the all-dielectric RF resonator;
- an optical coupling device coupling continuous wave (CW) light into the optical resonator to mix the CW light with the RF energy to cause optical modulation of the CW light based on the electro-optic effect to produce modulated light that carries the RF signal;
- an all-dielectric optical waveguide coupled to receive the modulated light from the optical resonator and to guide the modulated light away from the optical resonator; and
- an RF protected photodiode that receives the modulated light from the all-dielectric optical waveguide and converts the modulated light into an electrical signal representing the RF signal.

17. The device as in claim 16, wherein:
the optical resonator is a whispering gallery mode optical resonator.

18. The device as in claim 16, wherein:
the optical resonator is located inside the all-dielectric RF resonator.

19. The device as in claim 16, wherein:
the optical resonator is located outside the all-dielectric RF resonator to be adjacent to the all-dielectric RF resonator to be exposed to the RF energy stored by the all-dielectric RF resonator.

20. The device as in claim 16, comprising:
an all-dielectric RF antenna structured to wirelessly receive the RF signal from the air and electromagnetically coupled to the first waveguide end of the all-dielectric RF waveguide to couple the RF signal into the all-dielectric RF waveguide.

21. The device as in claim 20, wherein:
the all-dielectric RF antenna includes a tapered waveguide that has a larger first end that receives the RF signal and a smaller second end coupled to the first waveguide end of the all-dielectric RF waveguide, and a tapered waveguide section connected between the larger first end and the smaller second end and structured to have a cross section that reduces from the larger first end to the smaller second end and focuses the RF signal towards the smaller second end.

22. The device as in claim 16, wherein:
the first waveguide end of the all-dielectric RF waveguide is a first tapered tip and a narrow dielectric RF waveguide section connected to the first tapered tip to guide the RF input signal away from the first tapered tip.

23. The device as in claim 16, wherein:
the all-dielectric RF resonator is separate from the all-dielectric RF waveguide by a gap; and
a mechanism that adjusts the gap to control coupling of the RF signal in the all-dielectric RF waveguide into the all-dielectric RF resonator.

24. The device as in claim 16, wherein:
the all-dielectric RF resonator includes:
- a first tapered waveguide side that has a larger first end and a smaller second end, and a tapered waveguide section connected between the larger first end and the smaller second end and structured to have a cross section that reduces from the larger first end to the smaller second end; and
- a second tapered waveguide side that has a larger second end and a second tapered waveguide section connected to the larger second end and structured to (1) have a cross section that reduces from the larger second end and (2) connect to the smaller second end to form a waist section, wherein the optical resonator is located to interact with the RF signal at the waist section of the all-dielectric RF resonator.

25. The device as in claim 16, wherein:
the all-dielectric RF resonator includes:
- a dielectric cylindrical disk shaped to include a hollow cylindrical void inside dielectric cylindrical disk and off center from a symmetric axis of the dielectric cylindrical disk to form a narrow dielectric material section near an external side surface of the dielectric cylindrical disk; and, wherein the optical resonator is located to interact with the RF signal at the narrow dielectric material section near the external side surface of the dielectric cylindrical disk.

26. A device for receiving radio frequency (RF) signals, comprising:
- a dielectric RF antenna structured to receive an input RF signal and to output the received input RF signal; and
- an optical whispering gallery mode (WGM) resonator formed of an electro-optic material and located outside the dielectric RF antenna to directly receive the RF input signal to cause an electro-optic modulation of light in one or more WGM modes inside the optical WGM resonator based on interaction between the received input RF signal and the light in the electro-optic material so that the modulated light carries the input RF signal, wherein:
the dielectric RF antenna is structured to have an input end with a large cross section that receives the input RF signal and an output end with a small cross section smaller that the large cross section, and a tapered waveguide horn section connected between the input end and the output end and structured to have a cross section that reduces from the input end to the output end to guide the input RF signal to the output end, the output end being structured to have a concave opening to form a cavity or notch for outputting the input RF signal.

27. The device as in claim 26, wherein:
the optical WGM resonator is structured to be axially or cylindrically symmetric around an optic axis of the electro-optic material around which the WG modes circulate in a circular path or the equator, and
the optical WGM resonator is oriented to have the optic axis in alignment of an axis of the a tapered waveguide horn section of the tapered dielectric antenna.

28. The device as in claim 26, comprising:
a phase grating formed on the input end to cause the input RF signal to have a nonzero momentum at the optical WGM resonator.

29. The device as in claim 26, comprising:
the dielectric RF antenna and the optical WGM resonator are free of a metallic component.

30. A device for receiving radio frequency (RF) signals, comprising:
- a dielectric RF antenna structured to receive an input RF signal;
- a dielectric RF waveguide that is electromagnetically coupled to the dielectric RF antenna to receive the input RF signal;
- a dielectric RF resonator that is electromagnetically coupled to the dielectric RF waveguide section to receive the input RF signal and is structured to be in resonance with the received the RF input signal; and
- an optical whispering gallery mode (WGM) resonator formed of an electro-optic material and located outside the dielectric RF resonator to be in electromagnetic coupling to the dielectric RF resonator to receive the RF input signal that interacts with the electro-optic material to cause an electro-optic modulation of light in one or more WGM modes inside the optical WGM resonator so that the modulated light carries the input RF signal,
- wherein the dielectric RF antenna includes a cylindrical dielectric RF antenna section, and
- wherein:
- the dielectric RF resonator is spaced from the narrow dielectric RF waveguide section, and
- the device comprises a mechanism that adjusts a spacing between the dielectric RF resonator and the narrow dielectric RF waveguide section.

31. The device as in claim 30, wherein:
the dielectric RF waveguide includes a first tapered tip that is electromagnetically coupled to the dielectric RF antenna to receive the input RF signal and a narrow dielectric RF waveguide section connected to the first tapered tip to guide the RF input signal away from the first tapered tip.

32. The device as in claim 30, wherein:
the dielectric RF antenna, the dielectric RF waveguide, the dielectric RF resonator and the optical WGM resonator are free of a metallic component.

33. The device as in claim 30, wherein:
the dielectric RF resonator includes:
- a first tapered waveguide side that has a larger first end and a smaller second end, and a tapered waveguide section connected between the larger first end and the smaller second end and structured to have a cross section that reduces from the larger first end to the smaller second end; and
- a second tapered waveguide side that has a larger second end and a second tapered waveguide section connected to the larger second end and structured to (1) have a cross section that reduces from the larger second end and (2) connect to the smaller second end to form a waist section,
wherein the optical WGM resonator is located to interact with the RF signal at the waist section of the all-dielectric RF resonator.

34. The device as in claim 30, wherein:
the dielectric RF resonator includes:
- a dielectric cylindrical disk shaped to include a hollow cylindrical void inside dielectric cylindrical disk and off center from a symmetric axis of the dielectric cylindrical disk to form a narrow dielectric material section near an external side surface of the dielectric cylindrical disk; and,
wherein the optical WGM resonator is located to interact with the RF signal at the narrow dielectric material section near the external side surface of the dielectric cylindrical disk.

35. A device for receiving radio frequency (RF) signals, comprising:
- a tapered dielectric RF antenna structured to receive an input RF signal and to include a tapered waveguide that has a larger first end that receives the received input RF signal and a smaller second end, and a tapered waveguide section connected between the larger first end and the smaller second end and structured to have a cross section that reduces from the larger first end to the smaller second end and focuses the received input RF signal towards the smaller second end;
- a narrow dielectric RF waveguide including a first tapered tip that is electromagnetically coupled to the smaller second end of the tapered dielectric RF antenna to receive the input RF signal and a narrow dielectric RF waveguide section connected to the first tapered tip to guide the RF input signal away from the first tapered tip;
- a dielectric RF resonator that is electromagnetically coupled to the narrow dielectric RF waveguide section to receive the input RF signal and is structured to be in resonance with the received the RF input signal; and
- an optical whispering gallery mode (WGM) resonator formed of an electro-optic material and located outside the dielectric RF resonator to be in electromagnetic coupling to the dielectric RF resonator to receive the RF input signal that interacts with the electro-optic material to cause an electro-optic modulation of light in one or more WGM modes inside the optical WGM resonator so that the modulated light carries the input RF signal.

36. The device as in claim 35, wherein:
the optical WGM resonator is structured to be axially or cylindrically symmetric around an optic axis of the electro-optic material around which the WG modes circulate in a circular path or the equator, and
the optical WGM resonator is oriented to have the optic axis parallel to an electric polarization of the input RF signal.

37. The device as in claim 35, wherein:
the optical WGM resonator is structured to be axially or cylindrically symmetric around an optic axis of the electro-optic material around which the WG modes circulate in a circular path or the equator, and
the optical WGM resonator is oriented to have the optic axis perpendicular to an electric polarization of the input RF signal.

38. The device as in claim 35, comprising:
an optical coupler coupled to the optical WGM resonator to coupling light into the optical WGM resonator and to coupling the modulated light of the optical WGM resonator.

39. The device as in claim 35, wherein:
the dielectric RF resonator is spaced from the narrow dielectric RF waveguide section,
the device comprises a mechanism that adjusts a spacing between the dielectric RF resonator and the narrow dielectric RF waveguide section.

40. The device as in claim 35, wherein:
the tapered dielectric RF antenna, the narrow dielectric RF waveguide, the dielectric RF resonator and the optical WGM resonator are free of a metallic component.

41. The device as in claim 35, wherein:
the dielectric RF resonator includes:
- a first tapered waveguide side that has a larger first end and a smaller second end, and a tapered waveguide section connected between the larger first end and the smaller second end and structured to have a cross section that reduces from the larger first end to the smaller second end; and a second tapered waveguide side that has a larger second end and a second tapered waveguide section connected to the larger second end and structured to (1) have a cross section that reduces from the larger second end and (2) connect to the smaller second end to form a waist section, wherein the optical WGM resonator is located to interact with the RF signal at the waist section of the dielectric RF resonator.

42. The device as in claim 35, wherein:

the dielectric RF resonator includes:

a dielectric cylindrical disk shaped to include a hollow cylindrical void inside dielectric cylindrical disk and off center from a symmetric axis of the dielectric cylindrical disk to form a narrow dielectric material section near an external side surface of the dielectric cylindrical disk; and, wherein the optical WGM resonator is located to interact with the RF signal at the narrow dielectric material section near the external side surface of the dielectric cylindrical disk.

43. A device for receiving radio frequency (RF) signals, comprising a dielectric RF resonator antenna that receives and stores an RF signal without carrying an optical beam, and includes:

a first tapered waveguide side that has a larger first end and a smaller second end, and a tapered waveguide section connected between the larger first end and the smaller second end and structured to have a cross section that reduces from the larger first end to the smaller second end, and a second tapered waveguide side that has a larger second end and a second tapered waveguide section connected to the larger second end and structured to (1) have a cross section that reduces from the larger second end and (2) connect to the smaller second end to form a waist section, wherein the first tapered waveguide section and the second tapered waveguide section receive the RF signal and concentrate the received RF signal to the waist section with a higher RF intensity; and an optical resonator that exhibits an electro-optic effect and is located to interact with the RF signal at the waist section of the dielectric RF resonator antenna to modulate optical light inside the optical resonator to produce modulated light that carries the RF signal initially received by the RF resonator antenna.

44. The device as in claim 43, wherein:

the dielectric RF resonator is made of a dielectric material with a refractive index for the RF signal is 10 and the first and second tapered waveguide sides are structured to concentrate the RF signal at the waist section with a volume of $10^{-6}$ cm$^3$.

45. A device for receiving radio frequency (RF) signals, comprising:

a dielectric RF horn antenna that receives an RF signal;

a dielectric waveguide taper coupled to the dielectric RF horn antenna to direct the received RF signal from the RF horn antenna to a narrow part of the dielectric waveguide taper to increase an intensity of the received RF signal;

a dielectric RF resonator which is coupled to the dielectric waveguide taper to receive the RF signal and store the received RF signal and includes:

a dielectric cylindrical disk shaped to include a hollow cylindrical void inside dielectric cylindrical disk and off center from a symmetric axis of the dielectric cylindrical disk to form a narrow dielectric material section near an external side surface of the dielectric cylindrical disk; and, an optical resonator located to interact with the RF signal at the narrow dielectric material section near the external side surface of the dielectric cylindrical disk.

46. The device as in claim 45, wherein:

the optical resonator exhibits an electro-optic effect and, in response to the RF signal at the narrow dielectric material section, modulates optical light inside the optical resonator to produce modulated light that carries the RF signal initially received by the RF horn antenna.

47. The device as in claim 45, comprising:

a mechanism that adjusts a spacing between the dielectric RF resonator and the dielectric waveguide taper to provide an adjustable coupling gap.

48. The device as in claim 43, wherein:

the RF resonator antenna includes a straight dielectric waveguide section with a small cross section in the waist section between the first and second tapered waveguide sections.

* * * * *